United States Patent Office 3,166,650
Patented Jan. 19, 1965

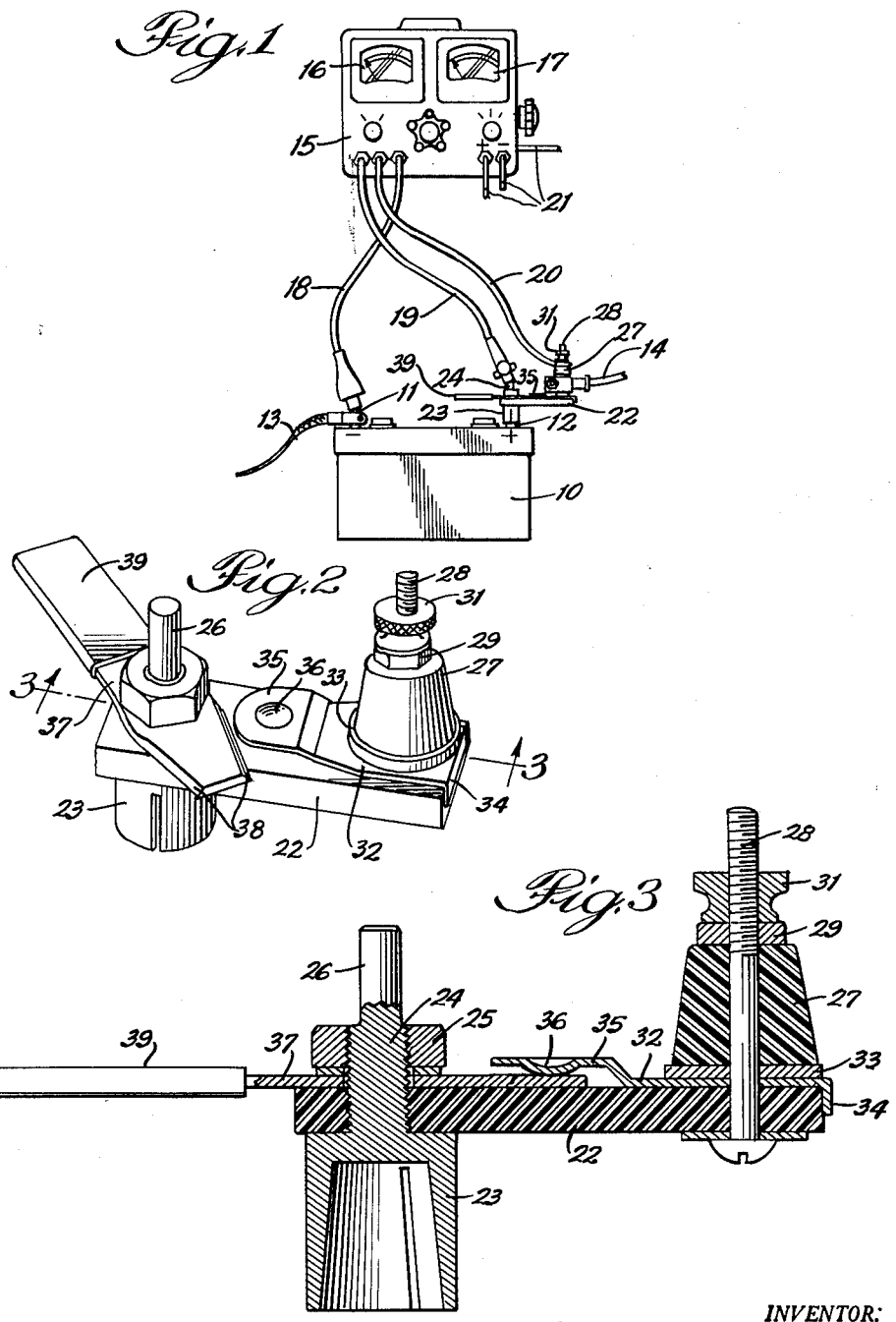

3,166,650
SWITCH ADAPTER AND CONNECTOR FOR AUTOMOBILE ELECTRICAL SYSTEM TESTERS
Robert C. Heidrich, Harwood Heights, Ill., assignor to Sun Electric Corporation, Chicago, Ill., a corporation of Illinois
Filed Nov. 20, 1961, Ser. No. 153,649
3 Claims. (Cl. 200—52)

This invention relates to testers for automobile electrical systems and more particularly to an adapter to enable voltage ampere tests to be performed easily on automobile electrical systems.

In automobiles as manufactured for many years, a regulator was employed in the electrical system to regulate the voltage and amperage of the generator which was provided with screw terminals for connecting it into the electrical system. A test instrument could easily be connected to these screw terminals and complete testing of the generator regulator and remainder of the electrical system could easily be accomplished. In modern automobiles using alternators, this type of regulator is not employed and there is no place in the system to which a test instrument can conveniently be connected to test the various parts of the systems. In many modern automobiles using D.C. generators the wiring system harnesses are permanently connected within the regulator assembly and it is therefore not possible to connect test instruments thereto in the manner previously employed.

It is accordingly an object of the present invention to provide an adapter for easy connection into an automobile electrical system and to which a test instrument can conveniently be connected for testing the various parts of the system.

Another object is to provide an adapter connected in series with the battery and which includes a switch to carry the heavy starting currents and to be opened for testing battery charging and output currents through a test instrument for performing various tests of the electrical system.

According to a feature of the invention, the adapter includes an insulating plate carrying a tapered socket fitting on a battery terminal and supporting the plate therefrom, a tapered post to receive the battery cable connector and connectors for test instrument leads, together with a switch mechanism directly to connect the socket and post.

The above and other objects and features of the invention will be more readily apparent from the following description when read in connection with the accompanying drawing, in which:

FIGURE 1 is a partial diagrammatic view of an automobile battery equipped with the adapter of the present invention and illustrating connection of a test instrument thereto;

FIGURE 2 is a perspective view of the adapter; and

FIGURE 3 is a section on the line 3—3 of FIGURE 2.

The adapter of the present invention is intended to be used in connection with a conventional automobile electrical system including a standard storage battery 10 having terminal posts 11 and 12 thereon to receive cables 13 and 14 connecting the posts respectively to ground and to the electrical system of the vehicle. For testing the electrical systems of such vehicles it is desired to measure the generator voltage and current, the battery voltage and current, the functioning of the regulator normally employed in the system and the remainder of the wiring harness.

This is accomplished by connecting into the system a test instrument, as indicated generally at 15, provided with an ammeter 16 and a volt meter 17. The instrument is provided with three leads 18, 19 and 20 which are utilized for measuring battery voltage and current, plus additional leads 21 of which three are shown for connection to the generator and to other parts of the electrical system for performing various kinds of tests thereon. Since these tests are more or less standardized and the connections and procedure required for their performance are known in the art, the specific tests will not be further described herein.

According to the present invention, the connection into the electrical system for measuring the current flow therethrough is made by an adapter formed for mounting on one of the terminals of the storage battery. As best seen in FIGURES 2 and 3, the adapter comprises a plate 22 of insulating material. Adjacent to one end of the plate and projecting from the lower surface thereof there is a metal socket 23 which is preferably split, as shown, to provide increased resiliency. The socket is adapted to fit tightly over one of the battery terminals and, as shown in FIGURE 1, fits over the positive terminal of the battery, the negative terminal being grounded. The socket is preferably secured to the plate by a threaded stem 24 thereon which projects through an opening in the plate and is secured by a nut 25. A connector stud 26 formed as an extension of the threaded stem extends upwardly therefrom to receive a clip on the end of the lead 19, as shown in FIGURE 1.

Adjacent to its opposite end the plate 22 carries an upwardly projecting post 27 corresponding in size and shape to the battery terminal post 12 to receive a standard connector on the end of the battery cable 14, as illustrated in FIGURE 1. The post 27 is preferably mounted on the plate by means of an elongated screw 28 extending through an opening in the plate and through the post and by a nut 29 threaded onto the screw and engaging the post. The post preferably projects beyond the screw 29 and receives a second screw 31 which can be utilized to connect the instrument lead 20 to the post.

In order that the test instrument need not carry the heavy current required by the starter motor when starting the engine of the automobile, a switch is provided for directly connecting the socket and the post. As shown, the switch is formed by a metal plate 32 fitting under the post 27, preferably with a washer 33 therebetween. One end of the plate 32 is bent downward, as shown at 34, to overlie the end of the plate 22 thereby to hold the plate 32 accurately positioned against accidental turning. At the opposite end, the plate 32 is bent upward to form an extension 35 which is resiliently biased toward the insulating plate 22, but which can move outward therefrom to the position shown in FIGURE 3. The extension 35 is preferably formed with a spherical depression defining a spherical projection on its lower surface.

The switch is completed by a flat metallic blade 37 having an opening therein through which the stem 24 extends so that it can be pivoted about the stem 24. At one end the blade 37 is formed with tapered edges, as shown at 38, to slip under the extension 35. At its opposite end, the blade 37 defines a handle which is preferably covered by a plastic sleeve 39 for convenient manipulation.

To use the adapter in performing tests of the automobile electrical system it is mounted on the battery terminal 12, as shown in FIGURE 1, and the instrument leads 19 and 20 are connected thereto, as illustrated. The instrument lead 18 may be clipped to the negative battery terminal 11, as shown, and the leads 21 may be connected to the generator, the regulator or other parts of the system as required depending upon the particular test to be performed.

With the adapter installed, the switch blade 37 is swung to the switch closing position shown in FIGURE 3 in which the end thereof presses beneath the extension 35 to form a good electrical contact therewith. When the engine is started, the heavy starting current will flow through the switch, bypassing the instrument so that the instrument will not be damaged by being overloaded. Once the engine is started and running normally, the blade 37 may be swung around to the position shown in FIGURE 2 to disconnect the socket 23 from the post 27. At this time, all of the currents involved in operation of the engine, including the charging current flowing through the battery from the generator, will flow through the leads 19 and 20 and through the ammeter 16 so that the currents can readily be measured. Voltage measurements across the battery can be obtained by measuring the voltage between the leads 18 and 19 on the voltage meter 17. The other tests normally performed on the other components of the electrical system can also be carried out in the usual way.

Upon completion of the tests the adapter and instrument leads can be removed from the battery and the connector on the battery cable 14 can be reconnected to the terminal 12. At this time, the automobile is restored to its normal operating condition. It will be seen that the adapter of the present invention can very easily be mounted on and removed from an automobile upon which tests are to be performed regardless of the type of regulator or other portions of the wiring harness which are employed.

While one embodiment of the invention has been shown and described herein, it will be understood that it is illustrative only and not to be taken as a definition of the scope of the invention, reference being had for this purpose to the appended claims.

What is claimed is:

1. In an automobile electrical system tester including a test instrument having leads for connection in series with an automobile battery and an automobile electrical system including a battery having connector posts thereon and cables terminating in connector sockets to fit onto said posts, a switch adapter and connector comprising an insulating supporting member, a tapered metal socket to fit onto a battery connector post, means securing the socket to the supporting member, a connector post adapted to receive a connector socket secured to the supporting member spaced from and insulated by the supporting member from the tapered metal socket, electrical connectors connected to the tapered metal socket and the connector post respectively to receive the test instrument leads, switch parts connected to the tapered metal socket and the connector post respectively, one of the switch parts being movable into and out of contact with the other, the switch parts when in contact being capable of transmitting relatively heavy current for starting an automobile engine in shunt with the test instrument and when out of contact causing all of the battery current to flow through a test instrument connected to the electrical connectors.

2. In an automobile electrical system tester including a test instrument having leads for connection in series with an automobile battery and an automobile electrical system including a battery having connector posts thereon and cables terminating in connector sockets to fit onto said posts, a switch adapter and connector comprising an elongated insulating plate, a tapered metal socket secured to the plate adjacent to one end to fit onto a battery post, a post secured to the plate adjacent to its other end to receive a connector socket on a battery cable, electrical connectors connected to the socket and the post respectively to receive the test instrument leads, a switch contact and a pivoted switch blade connected to the socket and the post respectively, the blade being engageable with the contact to complete a circuit shunting the connectors and an instrument connected thereto and which is capable of carrying relatively heavy current for starting an automobile engine, the blade when disengaged from the contact causing all of the current to flow through a test instrument connected to the connectors.

3. In an automobile electrical system tester including a test instrument having leads for connection in series with an automobile battery and an automobile electrical system including a battery having connector posts thereon and cables terminating in connector sockets to fit onto said posts, a switch adapter and connector comprising an elongated insulating plate, a tapered metal socket to fit onto a battery post, a stud on the socket extending through an opening in the plate at one end thereof to secure the socket to the plate, a post secured to the other end of the plate to receive a battery cable connector, connector means on the post and the stud to connect to the leads of a test instrument, a contact plate carried by the post extending toward the socket and yieldingly biased toward one face of the insulating plate, and a switch blade pivotally carried by the stud overlying said one face of the insulating plate and movable beneath and into contact with the contact plate to connect the socket and the post electrically, the switch blade and contact when engaged completing a circuit shunting the connectors and a test instrument connected thereto and when disengaged causing all of the battery current to flow through a test instrument connected to the connectors.

References Cited by the Examiner

UNITED STATES PATENTS

| 1,046,465 | 12/12 | Holt | 339—222 |
| 1,227,789 | 5/17 | Horton | 324—29.5 |
| 1,615,106 | 1/27 | Bethea | 339—224 |
| 1,807,439 | 5/31 | Ryan | 324—29.5 |
| 2,270,554 | 1/42 | Pugh | 324—29.5 |
| 2,458,930 | 1/49 | Crooke | 200—162 |
| 2,531,162 | 11/50 | Rutherford | 339—116 |
| 2,545,965 | 3/51 | McCamon | 200—161 |
| 2,690,544 | 9/54 | Haubursin | 324—29.5 |
| 2,780,777 | 2/57 | Sammis et al. | 324—29.5 |
| 2,786,921 | 3/57 | List | 200—161 |

FOREIGN PATENTS 814,033  3/37  France.

BERNARD A. GILHEANY, *Primary Examiner.*
ROBERT K. SCHAEFER, *Examiner.*